United States Patent
Li et al.

(10) Patent No.: US 10,474,579 B2
(45) Date of Patent: Nov. 12, 2019

(54) DYNAMIC MEDIA CACHE FOR A DATA STORAGE DRIVE IN AN INFORMATION HANDLING SYSTEM

(71) Applicant: Dell Products L.P., Round Rock, TX (US)

(72) Inventors: Wen Hua Li, Tampines (SG); Munif Farhan, Round Rock, TX (US); Ching Kang Lee, Tampines (SG)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 14/699,968

(22) Filed: Apr. 29, 2015

(65) Prior Publication Data
US 2016/0321174 A1    Nov. 3, 2016

(51) Int. Cl.
| | |
|---|---|
| *G06F 12/08* | (2016.01) |
| *G06F 12/0866* | (2016.01) |
| *G06F 12/0868* | (2016.01) |
| *G06F 12/0871* | (2016.01) |
| *G06F 12/0804* | (2016.01) |

(52) U.S. Cl.
CPC ...... *G06F 12/0866* (2013.01); *G06F 12/0804* (2013.01); *G06F 12/0868* (2013.01); *G06F 12/0871* (2013.01); *G06F 2212/1041* (2013.01); *G06F 2212/283* (2013.01); *G06F 2212/313* (2013.01); *G06F 2212/601* (2013.01); *G06F 2212/604* (2013.01)

(58) Field of Classification Search
CPC .......... G06F 2212/313; G06F 2212/28; G06F 12/0866; G06F 12/0868; G06F 12/0871
See application file for complete search history.

(56) References Cited

U.S. PATENT DOCUMENTS

| | | | | |
|---|---|---|---|---|
| 5,581,736 | A * | 12/1996 | Smith ..................... | G06F 12/08 711/113 |
| 8,639,872 | B1 * | 1/2014 | Boyle ................. | G06F 12/0871 711/103 |
| 2015/0109700 | A1 * | 4/2015 | Kashiwase ......... | G11B 5/59627 360/77.04 |
| 2015/0378621 | A1 * | 12/2015 | Bruner .................. | G06F 3/0619 711/114 |
| 2016/0019156 | A1 * | 1/2016 | Feldman ............. | G06F 12/0871 711/129 |
| 2016/0217078 | A1 * | 7/2016 | Chen ................... | G06F 12/0871 |

* cited by examiner

*Primary Examiner* — Masud K Khan
(74) *Attorney, Agent, or Firm* — Baker Botts L.L.P.

(57) ABSTRACT

A drive controller associated with a data storage medium may receive a command from a host to write a set of data to a storage space of the data storage medium. The drive controller may determine that insufficient space is available in a cache space of the data storage medium to write the set of data to the cache space and may dynamically convert an available portion of the storage space into a dynamic cache space associated with the cache space. The dynamic cache space may remain visible to the host as the available portion of the storage space. The drive controller may then write the set of data to the cache space and report to the host that the set of data is written to the storage space of the data storage medium.

17 Claims, 7 Drawing Sheets

FIG. 7

DYNAMIC MEDIA CACHE FOR A DATA STORAGE DRIVE IN AN INFORMATION HANDLING SYSTEM

BACKGROUND

Field of the Disclosure

This disclosure relates generally to information handling systems and more particularly to a dynamic media cache for a data storage drive used in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may process, store, and communicate information and may include one or more computer systems, data storage systems, and networking systems.

In various information handling systems, data may be written and stored on a data storage medium within a data storage drive. The data storage drive may include a drive controller configured to receive and execute commands. For example, host software running on the information handling system may provide the drive controller with a command to write a set of data to the data storage medium or to read a set of data from the data storage medium. Cache space on the data storage medium may be referred to as media cache space and may be configured to temporarily store data to facilitate writing data to or reading data from the data storage medium.

SUMMARY

In one aspect, a disclosed method may include a drive controller performing various steps. For example, the method may include receiving a command from a host to write a set of data to a storage space of a data storage medium associated with the drive controller. The method may also include determining that insufficient space is available in a cache space of the data storage medium to write the set of data to the cache space. The method may also include dynamically converting an available portion of the storage space into a dynamic cache space associated with the cache space based on determining that insufficient space is available in the cache space. The dynamically converted dynamic cache space may remain visible to the host as the available portion of the storage space. The method may also include writing the set of data to the cache space in response to dynamically converting the available portion into the dynamic cache space. Finally, the method may include reporting to the host that the set of data is written to the storage space of the data storage medium in response to writing the set of data to the cache space.

In another aspect, a disclosed apparatus may include a data storage medium including a storage space and a cache space, a processor, and a computer-readable medium including instructions that, when read and executed by the processor, may be configured to cause the processor to perform various steps. For example, the processor may receive a command from a host to write a set of data to the storage space of the data storage medium. The processor may also determine that insufficient space is available in the cache space of the data storage medium to write the set of data to the cache space. The processor may also dynamically convert an available portion of the storage space into a dynamic cache space associated with the cache space based on determining that insufficient space is available in the cache space. When the processor performs the dynamic conversion, however, the dynamic cache space may remain visible to the host as the available portion of the storage space. The processor may also write the set of data to the cache space in response to dynamically converting the available portion into the dynamic cache space. Finally, the processor may report to the host, in response to writing the set of data to the cache space, that the set of data is written to the storage space of the data storage medium.

In another aspect, an article of manufacture may include a machine-readable medium and instructions on the machine-readable medium that, when read and executed by a processor, may be configured to cause the processor to perform one or more of the steps described above in relation to the disclosed method and/or the disclosed apparatus.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In some examples, firmware associated with an information handling system component is stored in non-volatile memory that is accessible to one or more information handling system components. In the same or other examples, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), a compact disk, a CD-ROM, a DVD, random access memory (RAM), read-only memory (ROM), an electrically erasable programmable read-only memory (EEPROM), and/or a flash memory device such as a solid state drive (SSD). Computer-readable media may also include communications media such as wires, optical fibers, microwaves, radio waves, and other electromagnetic and/or optical carriers, and/or any combination of the foregoing.

Particular embodiments are best understood by reference to FIGS. 1-7 wherein like numbers are used to indicate like and corresponding parts.

Figure 1:
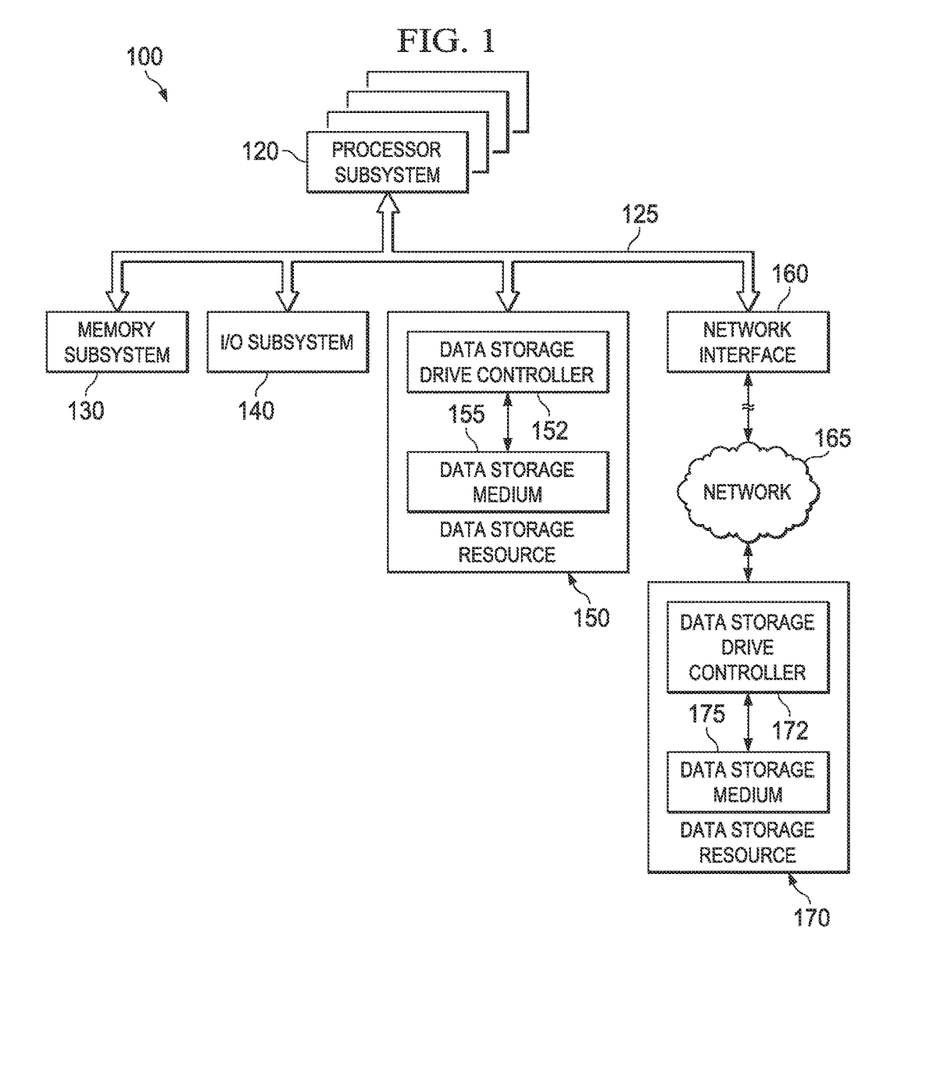
FIG. 1 is a block diagram of selected elements of an embodiment of an information handling system employing a data storage drive with a dynamic media cache.

FIG. 1 illustrates a block diagram of selected elements of an embodiment of an information handling system 100 employing a data storage drive with a dynamic media cache. More specifically, within information handling system 100, data storage resource 150 includes data storage drive controller 152 communicatively coupled with data storage medium 155. Data storage drive controller 152 may be configured to write data to and read data from data storage medium 155 based on commands received from other components of information handling system 100. As data storage drive controller 152 reads and writes, data storage drive controller 152 may dynamically convert storage space within data storage medium 155 into dynamic cache space according to various embodiments that will be described below.

As shown in FIG. 1, information handling system 100 may include processor subsystem 120, which may comprise one or more processors, and system bus 125, which may communicatively couple various other system components to processor subsystem 120. For example, system bus 125 may couple memory subsystem 130, I/O subsystem 140, and network interface 160 to processor subsystem 120. In certain embodiments, system bus 125 may also couple local data storage resource 150 to processor subsystem 120 such that processor subsystem 120 may send commands to data storage drive controller 152 to write data to and/or read data from data storage medium 155. System bus 125 may include one or more bus structures, each implemented by any one of a variety of suitable types of bus structures, such as a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI Express (PCIe) bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more microprocessors, microcontrollers, digital signal processors (DSPs), application specific integrated circuits (ASICs), or other digital or analog circuitry configured to interpret and/or execute program instructions and/or process data. In some embodiments, processor subsystem 120 may interpret and/or execute program instructions and/or process data stored locally (e.g., in memory subsystem 130 or in data storage resource 150). In the same or alternative embodiments, processor subsystem 120 may interpret and/or execute program instructions and/or process data stored remotely (e.g., in data storage resource 170). For example, processor subsystem 120 may interpret and/or execute certain program instructions that cause processor subsystem 120 to send read and/or commands to data storage resources 150 and/or 170. The commands sent by processor subsystem 120 may be executed by data storage drive controllers 152 and/or 172 to dynamically convert storage space of data storage media 155 and/or 175 into dynamic cache space according to various aspects described in more detail below in relation to FIG. 3.

Memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after information handling system 100 is powered down.

I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces.

Information handling system 100 may include one or more local storage resources such as data storage resource 150. Data storage resource 150 may include one or more hard disk drives, solid state drives, floppy disk drives, CD-ROM drive, and/or other types of data storage devices including a rotating storage medium, flash memory, EEPROM, and/or other types of computer-readable storage media. As shown in FIG. 1, data storage resource 150 may include data storage drive controller 152 and data storage medium 155. Data storage drive controller 152 may be communicatively coupled with system bus 125, allowing data storage drive controller 152 to communicate with other components of information handling system 100. For example, data storage drive controller 152 may be configured to receive commands from a host (e.g., software running on processor subsystem 120) and, according to the commands, may read data from and/or write data to data storage medium 155. Data storage medium 155 may include computer-readable media and may be generally operable to store instructions and/or data.

In operation, processor subsystem 120 or a remote client may send data storage drive controller 152 a command to write data (e.g., executable code in the form of program files) to data storage medium 155. Data storage drive controller 152 may write the data to a cached space of data storage medium 155 that holds the data temporarily until data storage drive controller 152 has time to move the data to a storage space of data storage medium 155. Later, data storage drive controller 152 may receive a command to read the data from data storage medium 155 (e.g., to load the executable code into memory subsystem 130 for execution by processor subsystem 120). Again, data storage drive controller 152 may utilize the cache space to facilitate recalling the data. For example, if the data has been recently or frequently read, the cache space may provide the data more readily than if data storage drive controller had to read the data from the storage space of data storage medium 155. In some embodiments, data storage drive controller 152 may be configured to dynamically convert an available portion of the storage space of data storage medium 155 into a dynamic cache space associated with the cache space. Dynamically converting of storage space into cache space may further facilitate reading and/or writing data to the storage space and will be described in more detail below.

As shown in FIG. 1, additional elements may also be included in or communicatively coupled to information handling system 100. For example, network 165 and data storage resource 170 may be external to information handling system 100 and/or located remotely from other elements of information handling system 100. As shown, data storage resource 170 may include data storage drive controller 172 and data storage medium 175.

Network interface 160 may be any suitable system, apparatus, or device operable to serve as an interface between information handling system 100 and a network 165. Network interface 160 may enable information handling system 100 to communicate over network 165 using a suitable transmission protocol and/or standard. For example, network 165 may implement, employ, or be a part of a network attached storage (NAS), a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 165 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 165 and its various components may be implemented using hardware, software, or any combination thereof. In certain embodiments, information handling system 100 and network 165 may be included in a rack domain.

In some embodiments, network interface 160 may be communicatively coupled via network 165 to a network storage resource such as data storage resource 170. For example, as shown, network data storage resource 170 may include data storage drive controller 172 and data storage medium 175. In certain examples, network data storage resource 170 may provide similar or identical functionality as described above in relation to local data storage resource 150. However, data storage resource 170 may differ from data storage resource 150 in that data storage resource 170 may be located remotely from information handling system 100 and may be accessible by information handling system 100 via network 165. Accordingly, reading and/or writing to data storage resource 170 may be associated with slower performance (e.g., longer latency) as compared to reading and/or writing to data storage resource 150, which may be integrated into information handling system 100. Specifically, data storage drive controller 152 may communicate directly with processor subsystem 120 and other elements of information handling system 100 over system bus 125 to provide faster performance (e.g., less latency) than may be possible over network interface 160 and network 165.

Figure 2:
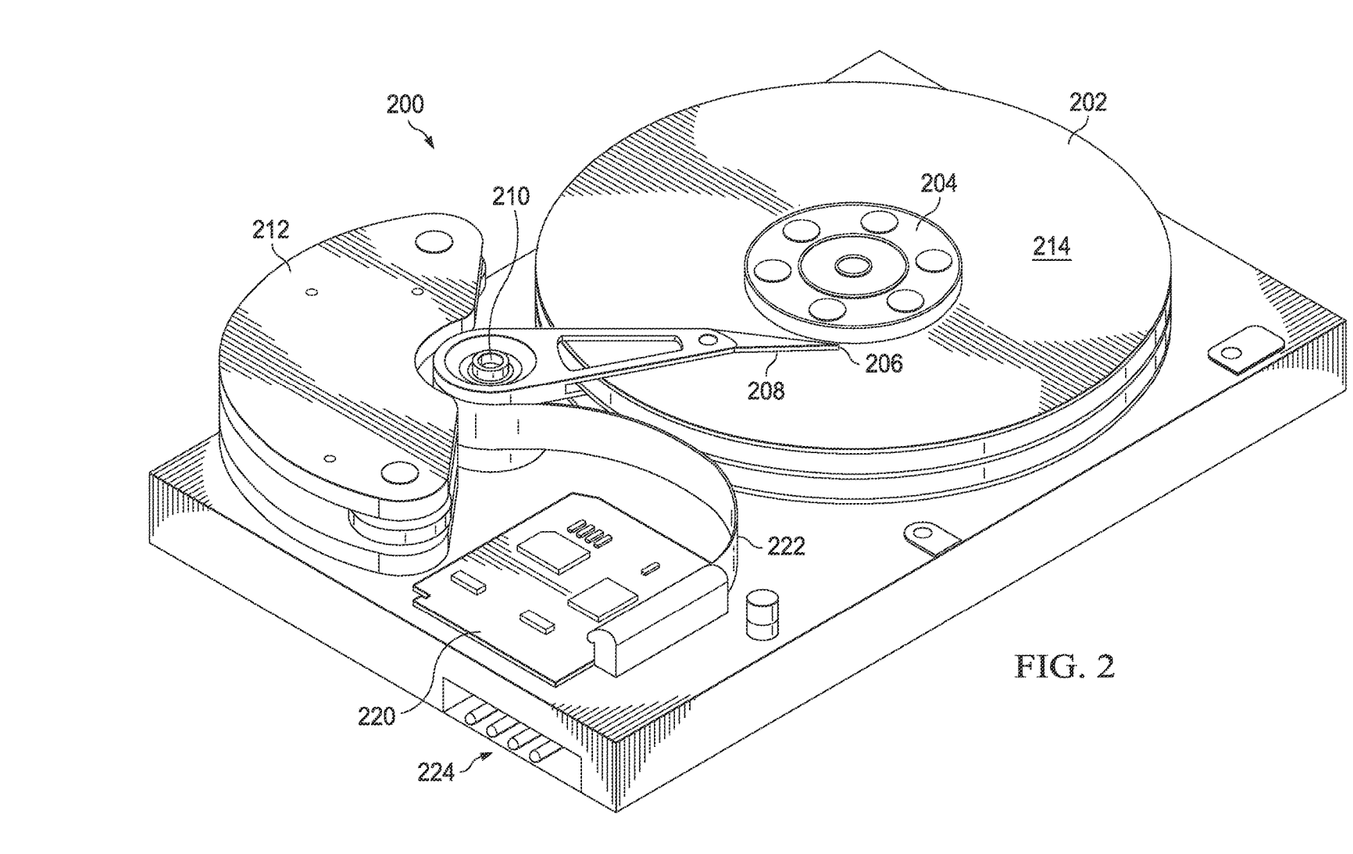
FIG. 2 is a perspective view of selected elements of an embodiment of a data storage drive within an information handling system that may include a dynamic cache.

FIG. 2 is a perspective view of selected elements of an embodiment of a data storage drive 200 within an information handling system that may include a dynamic cache. For example, data storage resources 150 and/or 170, discussed above in relation to information handling system 100 of FIG. 1, may be partially or fully implemented by data storage drive 200. Data storage drive 200 may be used to store instructions and/or data and, as such, may include one or more data storage media suitable for a specific embodiment. For example, in FIG. 2, data storage drive 200 is illustrated as a hard disk drive (HDD) with a data storage medium 202, shown as one of a plurality of hard disk platters. However, while FIG. 2 illustrates data storage drive 200 in the context of an HDD having particular elements, various modifications may be recognized by those of ordinary skill in the art to fall within the spirit and scope of the present disclosure. For example, in various embodiments, data storage drive 200 may include a solid state drive (SSD) and/or another suitable type of storage drive rather than an HDD. Additionally, data storage drive 200 may include more, fewer, or different elements than those illustrated in FIG. 2. For example, data storage drive 200 may include more or fewer hard disk platters than shown.

In FIG. 2, data storage medium 202 may be a hard disk platter configured to store magnetically encoded data in various ways. For example, surface 214 of data storage medium 202 may include an annular writeable portion on which data may be magnetically written or read using perpendicular magnetic recording (PMR) technology, shingled magnetic recording (SMR) technology, or another suitable recording technology. PMR and SMR technology will be described in more detail below in relation to FIG. 4. As shown, data storage drive 200 may include a plurality of hard disk platters similar to data storage medium 202 arranged vertically in a stack. While data storage medium 202 will be described in detail, it is noted that additional data storage media (e.g., other hard disk platters in the stack) may be configured to operate similarly or identically as data storage medium 202.

Data storage drive 200 may include several elements configured to facilitate writing data to and reading data from data storage medium 202. For example, as shown, spindle 204 may be may configured to support or hold data storage medium 202 to facilitate rotating (e.g., spinning) data storage medium 202 about a center of data storage medium 202. As such, spindle 204 may be arranged in the center of data storage medium 202 and may include a motor (not expressly shown) to cause the rotation. Read/write head 206 may be an electromagnetic device configured to interface with surface 214 of data storage medium 202 by magnetically writing data to and/or reading data from surface 214. Head arm 208 may include a support arm configured to support read/write head 206 and facilitate the positioning of read/write head 206 over a particular point of surface 214. Actuator axis 210 may provide an axis about which head arm 208 may be configured to swivel. Actuator 212 may include an actuator motor configured to precisely effect the swiveling of head arm 208 about actuator axis 210. Communication bus 222 may be a ribbon cable or other means of communicatively coupling actuator 212 and/or other components of data storage drive 200 to drive controller 220.

In certain embodiments, drive controller 220 may include hardware and/or software configured to receive and/or process instructions and to direct various elements of data storage drive 200 according to the instructions. For example, drive controller 220 may be an embodiment of data storage drive controller 152 or data storage drive controller 172, described above in relation to FIG. 1. Drive controller 220 may receive commands causing drive controller 220 to read and/or write data to data storage medium 202. In various embodiments, drive controller 220 may configure data storage medium 202 with a storage space and a cache space and may dynamically convert an available portion of the storage space into a dynamic cache space associated with the cache space, as described in more detail below in relation to FIG. 3. Interface connector 224 may facilitate communicatively coupling drive controller 220 to the host by a cable or other communicative means. Specifically, interface connector 224 may secure the cable to drive controller 220 such that the host may communicate with drive controller 220 over the cable. In some examples, interface connector 224 may include a parallel ATA or IDE connector, a serial ATA (SATA) connector, a SCSI connector, a serial attached SCSI (SAS) connector, a fiber channel connector, an IEEE 1394 (FireWire) connector, a USB connector, a Thunderbolt connector, or another suitable connector associated with a data transfer protocol.

In operation, a host (e.g., software running on processor subsystem 120, described above in relation to FIG. 1) may send a command to drive controller 220 through a cable or other communicative means connected to interface connector 224. For example, the host may send a command to drive controller 220 to write to or read from data storage medium 202. On receiving the command, drive controller 220 may process the command and direct the motor associated with spindle 204 to cause spindle 204 and data storage medium 202 to rotate at an appropriate rate so as to rotate data storage medium 202. Drive controller 220 may also direct actuator 212 to cause head arm 208 to swivel about actuator axis 210 to a particular arrangement whereby read/write head 206 may be positioned over a particular track of data storage medium 202. As data storage medium 202 rotates under read/write head 206, drive controller 220 may direct read/write head 206 to read data from or write data to data storage medium 202 according to the command from the host. For example, drive controller 220 may direct read/write head 206 to use PMR or SMR technology to read magnetically encoded data from or write magnetically encoded data onto an annular writeable portion of surface 214 of data storage medium 202 while data storage medium 202 rotates. When the read or write operation is complete, drive controller 220 may report back to the host that the operation was successful. If the operation included a read, drive controller 220 may also communicate the data read from data storage medium 202 to the host.

Figure 3:
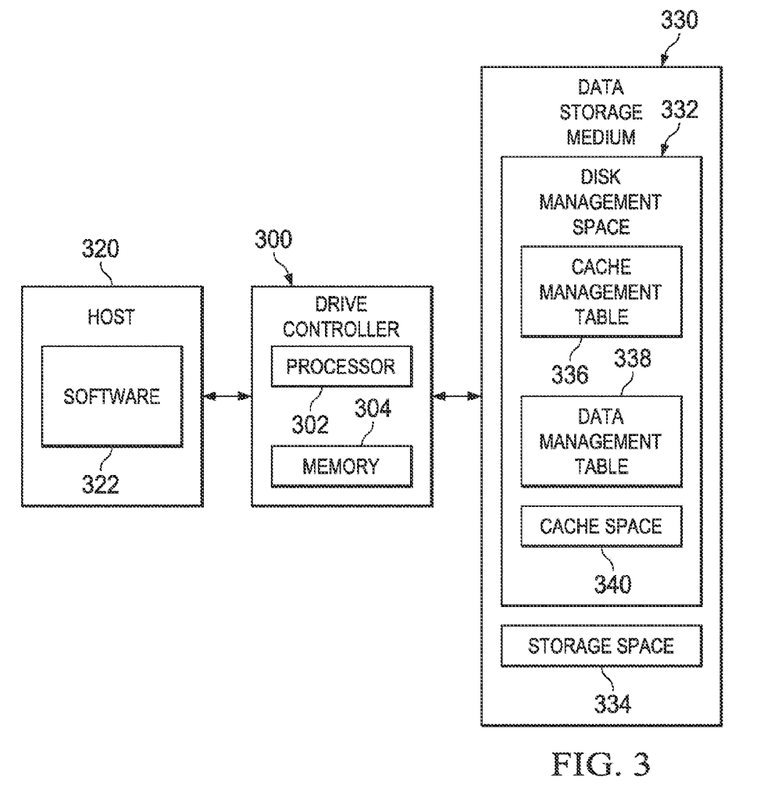
FIG. 3 is a block diagram of selected elements of an embodiment of a drive controller configured to dynamically convert an available storage space of a data storage medium into a dynamic cache space.

FIG. 3 is a block diagram of selected elements of an embodiment of a drive controller 300 configured to dynamically convert an available storage space of a data storage medium into a dynamic cache space. As shown, drive controller 300 is communicatively coupled with an exemplary host 320 and with an exemplary data storage medium 330. Drive controller 300 may be configured to receive commands from host 320 and direct data to be written to and read from data storage medium 330. For example, drive controller 300 may implement, fully or in part, drive controller 220 (described above in relation to FIG. 2) or data storage drive controllers 152 and/or 172 (described above in relation to FIG. 1). Similarly, host 320 may fully or partially implement software running on processor subsystem 120 (described above in relation to FIG. 1). Data storage medium 330 may fully or partially implement data storage medium 202 (described above in relation to FIG. 2) or data storage media 155 and/or 175 (described above in relation to FIG. 1).

As shown, drive controller 300 includes processor 302. Processor 302 may process commands received from host 320 by executing program instructions and performing calculations associated with reading and writing data to storage. Processor 302 may be implemented by any type of processor, such as a microcontroller, a digital signal processor (DSP), a field-programmable gate-array, an application-specific integrated circuit, or any other digital or analog circuitry configured to interpret and/or execute program instructions and/or process data. Processor 302 may be configured to interpret and/or execute program instructions and/or data stored in memory 304.

Memory 304 may be implemented by computer-readable memory media. For example, memory 304 may encompass persistent and volatile media, fixed and removable media, and magnetic and semiconductor media, among others. Memory 304 is operable to store program instructions, data, or both. For example, program instructions stored in memory 304 may take any suitable form such as code, functions, libraries, scripts, applications, firmware, etc. Memory 304 may include or store sets or sequences of instructions executable by processor 302, as well as other information, such as data related to reading and writing data to a data storage medium. Program instructions stored in memory 304 may configure drive controller 300 to perform various tasks including, without limitation, directing data to be written to data storage medium 330, directing data to be read from data storage medium 330, and directing that an available portion of a storage space on data storage medium 330 be dynamically converted into a dynamic cache space associated with a cache space on data storage medium 330.

Host 320 may include hardware and/or software within an information handling system such as information handling system 100, described above in relation to FIG. 1. More particularly, host 320 may include software instructions within a memory (e.g., memory subsystem 130) directing hardware (e.g., processor subsystem 120) to perform particular tasks. For example, software 322 may include, without limitation, driver software, operating system software, or application software running on host 320. According to instructions from software 322, host 320 may direct drive controller 300 to read data requested by software 322 from storage or write data that software 322 designates into storage.

Data storage medium 330 may implement, fully or in part, data storage medium 202 in FIG. 2 or data storage media 155 and/or 175 of FIG. 1. For example, data storage medium 330 may include one or more hard disk platters in a hard disk drive, flash memory in a solid state drive, or other suitable storage. Data storage medium 330 may be configured to store and recall data as directed by drive controller 300. As such, data storage medium may include disk management space 332 for storing management data related to operating data storage medium 330, and storage space 334 for storing data designated by host 320.

Storage space 334 may be configured to store data designated for storage by host 320. Storage space 334 may take up most of the writeable surface area of data storage medium 330 and may provide a long-term storage location for data that host 320 designates for storage by drive controller 300.

Disk management space 332 may be configured to store data associated with enabling and improving proper operation of data storage medium 330 within a data storage drive. Disk management space 332 may use a smaller portion of the writeable surface area of data storage medium 330 than storage space 334 and may be physically separated from storage space 334 on data storage medium 330. For example, in an embodiment where data storage medium 330 is a hard disk platter (e.g., as described above in relation to data storage medium 202 of FIG. 2), a contiguous, annular area around the outer diameter of data storage medium 330 may be formatted and set apart as disk management space 332. This will be illustrated and described in more detail below in relation to FIG. 5.

While disk management space 332 may be configured to store data, the storage capacity of disk management space 332 might not be configured to be available for long-term storage of data designated for storage by host 320. As such, the storage capacity associated with disk management space 332 might not be visible to host 320. For example, drive controller 300 might not indicate to host 320 that disk management space 332 exists or includes available storage space. Accordingly, if data storage medium has a total storage capacity of 600 gigabytes (GB) and 100 GB are formatted or otherwise set apart as disk management space 332, drive controller 300 may report to host 320 that 500 GB of storage space is available on data storage medium 330 when data storage medium 330 is empty (e.g., when no data is stored on data storage medium 330). Thus, 500 GB, rather than 600 GB, of storage capacity may be visible to host 320 as being available for storing data, while 100 GB may be invisible to host 320, or visible but unavailable for storing data.

Within disk management space 332, management data such as overhead data, metadata, temporary or cached data, and/or other data used by drive controller 300 to efficiently perform data storage and recall operations at the direction of host 320 may be stored. As shown in FIG. 3, disk management space 332 may include within the contiguous block of data storage medium 330 a cache management table 336, a data management table 338, and a cache space 340. Additionally, disk management space 332 may further include other data spaces configured to store other management data not expressly illustrated in FIG. 3.

Cache management table 336 may be implemented on a dedicated area of disk management space 332. Cache management table 336 may be configured to store information indicative of what data is currently stored in cache space 340 and may be read and updated by drive controller 300 to help drive controller 300 track information about cache space 340. For example, cache management table 336 may store the identity of data currently stored in cache space 340, the status of data stored within cache space 340, the location of data within cache space 340, etc.

Similarly, data management table 338 may be implemented on another dedicated area of disk management space 332. Data management table 338 may be configured to store information indicative of data currently stored in storage space 334 and may allow drive controller 300 to track information about data stored in storage space 334. For example, data management table 338 may include information about how much storage space is available within storage space 334 and where available storage blocks are located within data storage medium 330. Data management table 338 may also include identity information, status information, location information, and other information related to data stored within storage space 334. For example, data management table 338 may include information such as whether the data is active or may be reclaimed, whether the data should be migrated to a different location within storage space 334, and so forth. Data management table 338 may also include metadata such as the size of data stored within storage space 334, the identity of software that the data is associated with (e.g., software 322 running on host 320), and so forth. Data management table 338 may also include any other information enabling drive controller 300 to read and write data to data storage medium 330 properly and/or efficiently.

Cache space 340 may be implemented on another dedicated area of the contiguous block of disk management space 332. Cache space 340 may be configured to cache data during the process of reading the data from or writing the data to storage space 334. For example, cache space 340 may be used as a holding space to temporarily store the data before writing the data more permanently to storage space 334. Additionally, cache space 340 may be used to store recently and/or frequently accessed data to provide host 320 with easier access to the data when reading the data.

Cache space 340 may allow drive controller 300 to read and write data more efficiently. In certain examples, drive controller 300 could be configured to always write data directly to storage space 334 and to always read data directly from storage space 334. However, always writing and reading in this manner may be inefficient. Mechanical or other limitations of storage drive technology such as spinning a hard disk platter at a particular speed, moving a read/write head to a particular location, etc., make direct write and read operations take relatively long periods of time. Such limitations are compounded when data is broken into fragments and written to different parts of the data storage medium. Accordingly, write operations may be made more efficient by using cache space 340 as a buffer for data designated to be ultimately stored in storage space 334. Specifically, immediately after receiving a request from host 320 to write data to storage space 334, drive controller 300 may write the data to a contiguous area within cache space 340. Later, when drive controller 300 finishes higher priority tasks, drive controller 300 may flush (e.g., copy or move) the data from the temporary location within cache space 340 to a more permanent location within storage space 334. In a similar manner, inefficiencies in reading frequently or recently accessed data directly from data storage medium 330 may be improved by employing cache space 340 as a readily accessible buffer to temporarily hold the frequently or recently accessed data.

As long as cache space 340 has enough storage space to readily buffer data to be written to storage space 334 and hold frequently and/or recently accessed data, cache space 340 may increase the efficiency with which drive controller 300 can perform write and read operations. However, as cache space 340 fills up (e.g., because it is too busy with higher-priority tasks to flush data from cache space 340 into storage space 334), the efficiency gains provided by cache space 340 may decline, causing the overall performance of drive controller 300 to diminish. Such performance decreases may create undesirable effects for a user of software 322 of host 320 because drive controller 300 might not be able to keep up with the demands of the software. Accordingly, dynamically increasing the size of cache space 340 in response to determining that cache space 340 is becoming too full to realize intended efficiency gains may be desirable. Methods for dynamically increasing the size of cache space 340 will be described in more detail below in reference to FIGS. 6-7.

Figure 4A:
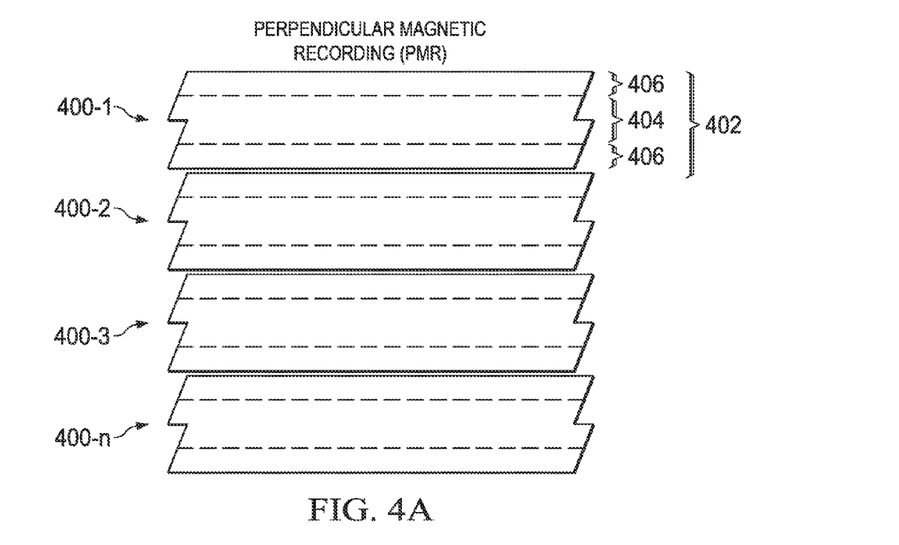
FIG. 4A is a top view of exemplary data tracks written on a data storage medium using perpendicular magnetic recording (PMR)
Figure 4B:
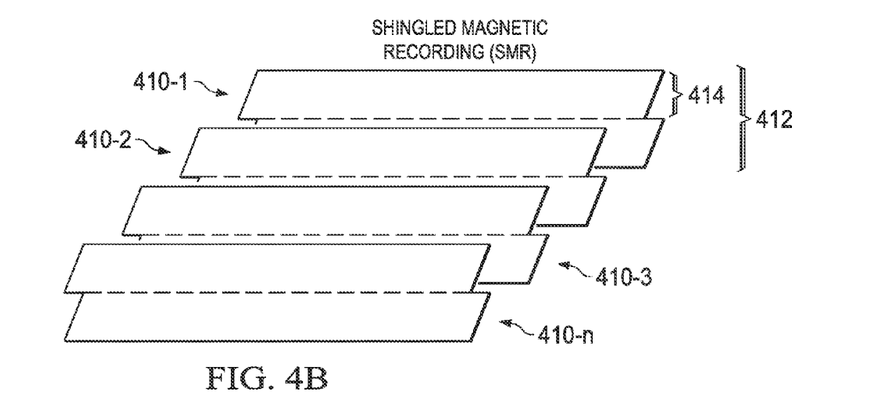
FIG. 4B is a top view of exemplary data tracks written on a data storage medium using shingled magnetic recording (SMR)

FIGS. 4A and 4B (collectively FIG. 4), illustrate different technologies that may be used to read and write data from a data storage medium such as data storage medium 202 of FIG. 2 or data storage medium 330 of FIG. 3. More specifically, FIG. 4A shows a top view of exemplary data tracks written on a data storage medium using perpendicular magnetic recording (PMR), while FIG. 4B shows a top view of exemplary data tracks written on a data storage medium using shingled magnetic recording (SMR).

Referring to data storage medium 202 of FIG. 2 as an example, data may be stored on data storage medium 202 along one or more spiral-shaped or circular tracks. For example, a single continuous track may start at an outer diameter of data storage medium 202 and spiral inward toward an inner diameter of data storage medium 202. Additionally or alternatively, a plurality of concentric circular tracks of different diameters may be arranged from the outer diameter to the inner diameter of data storage medium 202. In FIG. 4, relatively short lengths of adjacent track sections 400 (e.g., 400-1 through 400-n) and 410 (e.g., 410-1 through 410-n) are shown. While track sections 400 and 410 may be illustrated as being rectangular and identical, it will be understood that each track section 400 and 410 may actually be a short arc of a larger spiral-shaped or circular track.

As shown in FIG. 4A, PMR track sections 400 may be arranged in close proximity to one another. In certain examples, PMR track sections 400 may touch or very nearly touch one another so that the areal density of data written onto the data storage medium by the read/write head may be maximized. Because of intrinsic characteristics of the technology of certain read/write heads, the width of a track written by a read/write head may be different than the width of a track read by the read/write head. For example, as shown in FIG. 4A, the technology in a read/write head may cause the read/write head to write data with width 402 while reading data with narrower width 404. Because the tracks do not overlap, data may be written to and/or read from each track independently of the other tracks. Accordingly, PMR technology allows data to be written and/or read randomly (e.g., non-sequentially) from different areas of the data storage medium in a straightforward and efficient manner. Each track may not only be read independently, but may also be written or read and rewritten independently. However, because each track is independent and overlapping, PMR technology may inefficiently waste certain portions of each track by writing to the portions but never reading them back. Specifically, margins 406 illustrate portions of tracks 400 that may be written by the read/write head but not used for reading by the read/write head. The areal density of tracks on a data storage medium could be increased if margins 406 were repurposed to store additional data.

As shown in FIG. 4B, SMR track sections 410 may not only be in close proximity to one another, but may actually overlap with one another. As with PMR technology illustrated in FIG. 4A, a read/write head may write data to tracks 410 with width 412 while reading data with narrower width 414. However, in order to increase the areal density of tracks on the data storage medium, the read/write head may be configured to write over a portion of a neighboring track that might not be read by the read/write head anyway. Accordingly, each track may overlap with a neighboring track similar to the way that shingles overlap on a roof. SMR technology reduces or eliminates portions of the track not used for reading (e.g., margins 406 of FIG. 4A) so as to allow for greater areal density of tracks on a data storage medium. Thus, given a particular region of a data storage medium, more data may be stored within the region when the data is written using SMR technology than when the data is written using PMR technology.

Unfortunately, the increased areal data density of SMR technology may cause each track to be dependent on neighboring tracks, making random writes more complicated. Specifically, because of the overlap of the tracks written by SMR technology, writing one track may overwrite an overlapping portion of a neighboring track. For example, if a read/write head writes track 410-1, a readable portion at the top of track 410-2 may be partially or completely overwritten. This effect may be mitigated by reading an independent band of SMR tracks (e.g., a set of tracks that may overlap with one another but not with other tracks) and rewriting the entire band of SMR tracks sequentially. For example, tracks 410 illustrated in FIG. 4B may represent a single band of tracks such that no other track overlaps with track 410-n, and a drive controller may be configured to write data to track 410-1. The drive controller may first read the data from each of the four tracks (e.g., along the top portion with width 414 of each track), and then rewrite all the tracks in order from 410-1 down to 410-n to overwrite part of the track with new data while rewriting another part of the track not intended to be changed with the old data. In this way, the data on each track may remain intact and the benefits of the increased track density will be realized. However, it may be undesirable or unacceptable for a host program directing the data to be written to have to wait for each track to be read and rewritten in this way.

Accordingly, a drive controller may be configured to employ both PMR technology and SMR technology on the same data storage medium. For example, a drive controller may employ PMR technology for data caching and other disk management (e.g., disk management space 332 of FIG. 3) while employing SMR technology for longer-term data storage (e.g., storage space 334 of FIG. 3). Specifically, as described above in relation to FIG. 3, data designated by host 320 to be stored may be quickly written to cache space 340 (using PMR technology) and then, when the drive controller has time, flushed to higher-density storage space 334 (using SMR technology). In this way, the drive controller may mitigate the undesirable delay of SMR writes while still realizing the benefit of higher SMR areal data density.

While the combination of PMR and SMR technology may provide great benefits while cache space 340 has remaining capacity, the benefits may become exhausted and performance of the data storage drive may decrease as cache space 340 fills up. For example, as cache space 340 (formatted as PMR) fills up, the data storage controller may have to write data designated by the host directly to storage space 334 (formatted as SMR), which may be slow due to the nature of SMR technology as described above. Additionally, because cache space 340 and storage space 334 are formatted differently, it may be difficult to determine how much disk space to allocate to cache space 340 and how much to allocate for the host to use as storage space 334.

In certain embodiments, cache space 340 and storage space 334 may be configured such that cache space 340 may dynamically increase and decrease in response to current needs of the host. For example, when the host writes large amounts of data at once so that cache space 340 would fill up and performance of the data storage drive would decrease, the drive controller may borrow an available portion of storage space 334 and reformat the space to use PMR technology for caching data. Later, when storage space 334 nears full capacity and/or when the host decreases the frequency of writes such that the drive controller has more time, the drive controller may dynamically return the borrowed space from cache space 330 back to storage space 334 by reformatting the space using SMR technology and again making it available for data storage. As will be described in more detail below in relation to FIGS. 5-7, the drive controller might not report this borrowing and/or reformatting to the host but may make the borrowed space appear to be available storage space even while the space is actually temporarily converted for use as dynamic cache space.

Figure 5:
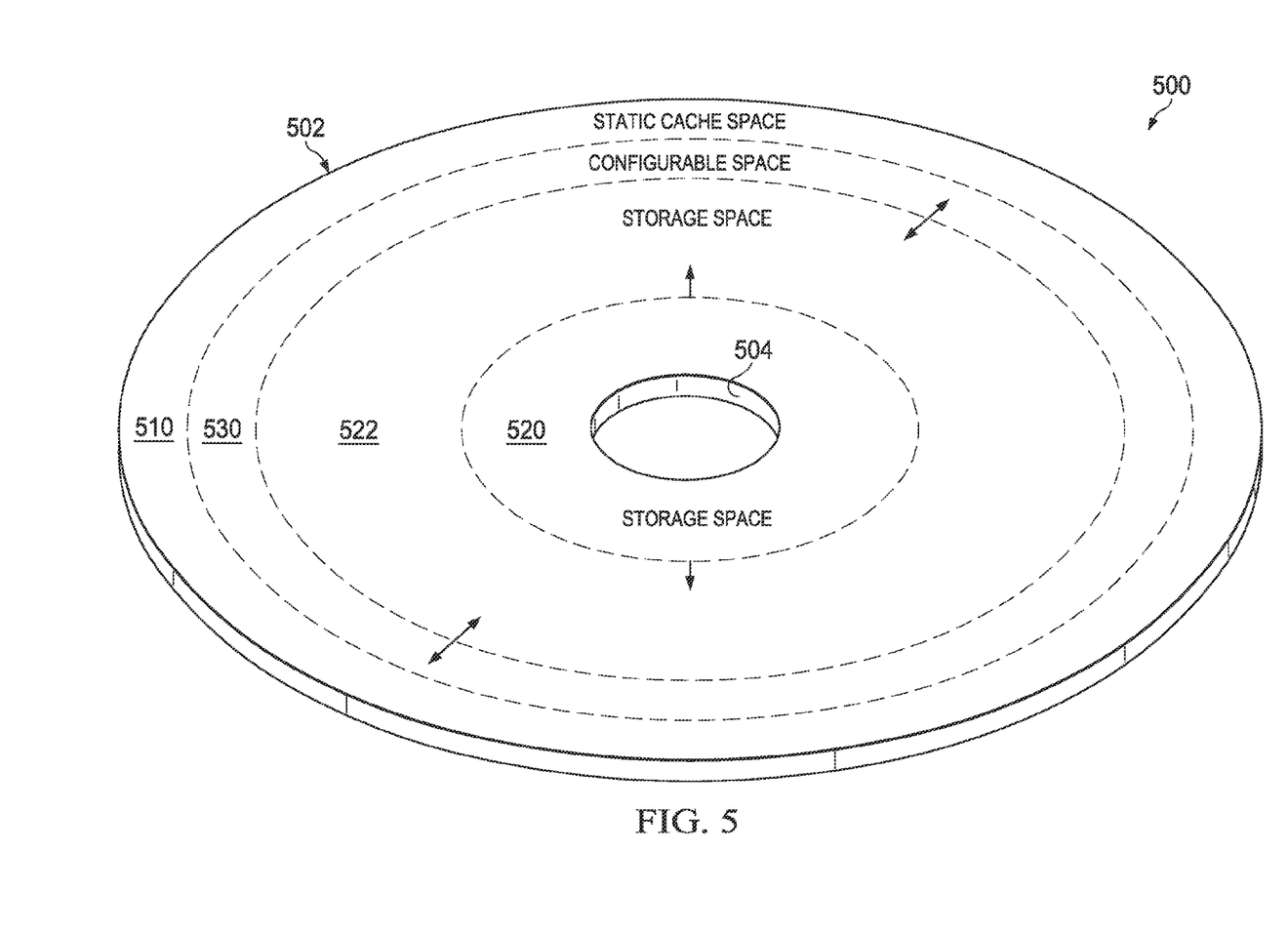
FIG. 5 is a perspective view of selected elements of a data storage medium having a cache space and a storage space, the storage space having an available portion that may be dynamically converted into a dynamic cache space associated with the cache space.

FIG. 5 is a perspective view of selected elements of an embodiment of a data storage medium having a cache space and a storage space, the storage space having an available portion that may be dynamically converted into a dynamic cache space associated with the cache space. Specifically, a data storage medium 500 may include an annular writeable portion with data tracks (e.g., similar to tracks 400 and/or 410 of FIG. 4) written and read between outer diameter 502 and inner diameter 504.

As shown, a disk management space including static cache space 510 may be written beginning proximate outer diameter 502 of the writeable portion and progressing substantially inward toward inner diameter 504 of the writeable portion. The disk management space may be formatted to use PMR technology, described above in relation to FIG. 4, and may be an embodiment of disk management space 332, described above in relation to FIG. 3. As such, the disk management space may include a cache management table fully or partially embodying cache management table 336 and a data management table fully or partially embodying cache management table 338 (not expressly shown). The disk management space may also include static cache space 510. As will be described in more detail below, static cache space 510 may be dynamically associated with a dynamic cache illustrated as configurable portion 530. Together, static cache space 510 and configurable portion 530 (formatted to constitute a dynamic cache space) may form a cache space fully or partially embodying cache space 340 described in relation to FIG. 3. For clarity of description, the management tables and/or other parts of the disk management space are not explicitly illustrated in FIG. 5, but will be understood to be arranged in any suitable location on data storage medium 500. For example, the management tables and/or other parts of the disk management space may be arranged proximate outer diameter 502 near static cache space 510.

Because of the geometry of the disk, data tracks near outer diameter 502 may be faster to write and read than data tracks near inner diameter 504. For example, with one rotation of data storage medium 500, a relatively long data track may pass under a read/write head positioned near outer diameter 502 while a relatively short data track may pass under the read/write head if the head is positioned near inner diameter 504. Accordingly, arranging static cache space 510 near outer diameter 502 may help ensure that data from the host can be written as quickly as possible into static cache space 510.

As shown in FIG. 5, storage space 520 may be used to store data on a more long-term basis. For example, data written temporarily to static cache space 510 may be flushed to storage space 520 for long-term storage when the drive controller has time to perform such a flush. In contrast to static cache space 510, storage space 520 may be written beginning proximate inner diameter 504 of the writeable portion and may progress substantially outward toward outer diameter 502 of the writeable portion. For example, data may be written to storage space 520 using a time-based algorithm. More specifically, each set of data received from the host may be written to storage space 520 based on a time stamp associated with the set of data such that sets of data received from the host earlier in time may be stored more proximate inner diameter 504 and sets of data received from the host later in time may be stored more proximate outer diameter 502. Although the data tracks near inner diameter 504 might not be as quickly accessible as the data tracks near outer diameter 502, writing storage space 520 might likewise not be as critical as writing static cache space 510, since storage space 520 may be written primarily when the drive controller has time available.

Storage space 522 illustrates a part of the storage space between static cache space 510 and storage space 520. While storage space 520 may already be written with data, storage space 522 may still be unused and available for storing data from the host. Thus, as illustrated, storage space 520 may grow into storage space 522. Storage spaces 520 and 522 may be formatted to use SMR technology, described above in relation to FIG. 4. Together, storage spaces 520 and 522 may implement a storage space analogous to storage space 334, described above in relation to FIG. 3. As such, storage spaces 520 and 522 may be configured to store data designated for storage by a host with a high areal data density. However, because of the overlap inherent in SMR technology, storage spaces 520 and 522 may be associated with relatively poor performance for writing data, particularly for random, non-sequential writes.

As shown in FIG. 5, configurable space 530 may be arranged between static cache space 510 and storage space 522 on data storage medium 500. Configurable space 530 may be large or small and may dynamically change in size and relative location (e.g., nearer or farther from outer diameter 502 and inner diameter 504) according to current circumstances within data storage medium 500. Specifically, as will be described in more detail below in reference to FIGS. 6 and 7, a drive controller may dynamically convert (e.g., reformat) configurable space 530 to be either an available portion of storage space 522 or a dynamic cache space associated with static cache space 510.

For example, if the drive controller determines that there is plenty of available storage space on data storage medium 500 (e.g., storage space 522 is relatively large) but that static cache space 510 is nearly or completely filled, the drive controller may convert configurable space 530 to be a dynamic cache space associated with static cache space 510. More specifically, the total cache space on data storage medium 500 may include both static cache space 510, which may have a fixed size and may be always unavailable to be used by the host as part of the storage space, as well as configurable space 530, which may be converted from storage space 522 (e.g., the available portion of the storage space). When the drive controller determines that little storage space is available on data storage medium 500 (e.g., storage space 522 is small) and/or that static cache space 510 has sufficient capacity, the drive controller may dynamically reconvert (e.g., reformat) configurable space 530 from the dynamic cache space back into the available portion of the storage space.

When the drive controller converts configurable space 530 from the available portion of the storage space formatted using SMR technology into dynamic cache space formatted using PMR technology, the drive controller may take into account a conversion ratio indicative of the relative areal data densities of the SMR and PMR technologies. Similarly, when the drive controller reconverts configurable space 530 from the dynamic cache space formatted using PMR technology back into the available portion of the storage space formatted using SMR technology, the drive controller may use an inverse conversion ratio in a similar way. For example, because SMR technology is capable of storing data with a higher areal data density than PMR technology, the drive controller may determine that configurable space 530 can store a larger amount of data (e.g., 4 GB) when formatted as storage space using SMR technology, and a smaller amount of data (e.g., 3 GB) when formatted as dynamic cache space using PMR technology. Thus, when determining how much available storage space to convert into dynamic cache space, a conversion ratio indicative of the different areal data densities may be employed. For example, if the drive controller determines that 3 GB of dynamic cache space are to be created, the drive controller may determine that 4 GB of storage space may be converted to do so. Similarly, when the drive controller reconverts configurable space 530 from dynamic cache space (PMR) back into storage space (SMR), an inverse of the conversion ratio may be taken into account in a similar way. For example, the drive controller may determine that 3 GB of dynamic cache space may provide 4 GB of available storage space when converted and reformatted.

Thus, the cache space and the storage space may dynamically grow and shrink together according to circumstances imposed by the host on the data storage drive. In one embodiment, regardless of how configurable space 530 is formatted and/or is being used by the drive controller, the drive controller may represent to the host that configurable space 530 is always available for use by the host in storing data. Accordingly, various dynamic conversions of configurable portion 530 from available storage space to dynamic cache space or from dynamic cache space to available storage space may be performed unilaterally by the drive controller without making the host aware of the conversions.

Figure 6:
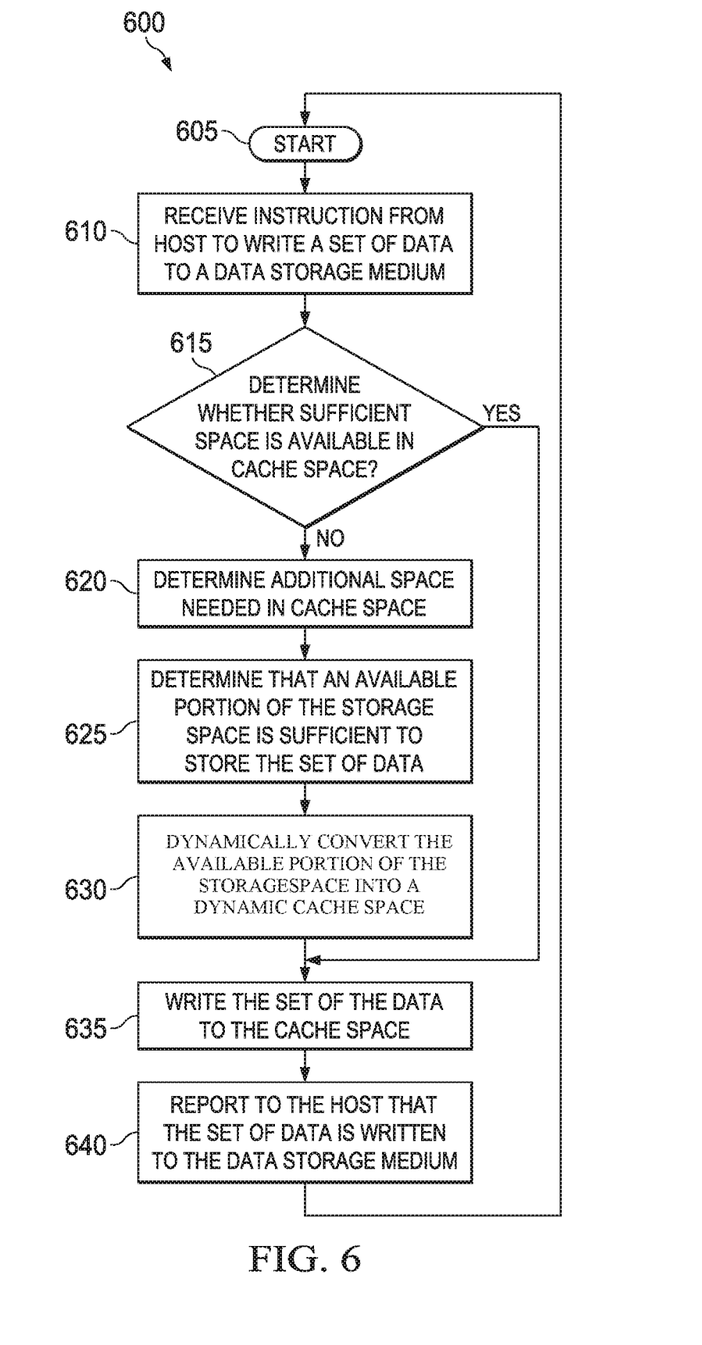
FIG. 6 is a flowchart depicting selected elements of an embodiment of a method for provisioning and using a dynamic cache space in a data storage drive within an information handling system.

FIG. 6 is a flowchart depicting selected elements of an embodiment of a method for provisioning and using a dynamic cache space in a data storage drive within an information handling system. In various embodiments, the steps of method 600 may be performed in any order or may be performed simultaneously in parallel with one another. Method 600 may also be performed before, after, or in parallel with method 700, described below in relation to FIG. 7. Method 600 may be performed by a drive controller such as data storage drive controllers 152 or 172 of FIG. 1, drive controller 220 of FIG. 2, or drive controller 300 of FIG. 3. The drive controller may be associated with and may perform method 600 using one or more data storage media such as data storage media 155 or 175 of FIG. 1, data storage medium 202 of FIG. 2, data storage medium 330 of FIG. 3, or data storage medium 500 of FIG. 5. In particular, the data storage medium may include a cache space (e.g., an implementation of cache space 340 in FIG. 3 or cache space 510 in FIG. 5), a storage space (e.g., an implementation of storage space 334 in FIG. 3 or storage spaces 520 and 522 in FIG. 5), and a configurable space that may be dynamically converted from an available portion of the storage space into a dynamic cache space associated with the cache space (e.g., an implementation of configurable space 530 in FIG. 5). The drive controller may perform method 600 based on direction received from a host such as host 320, described above in reference to FIG. 3.

Method 600 may begin at step 605 and wait for a communication from the host before advancing to step 610. At step 610, the drive controller may receive a command from the host to write a set of data to the data storage medium. Method 600 may then advance to step 615.

At step 615, the drive controller may determine whether sufficient space is available in the cache space to temporarily store the set of data. For example, the drive controller may refer to a cache management table to determine if the cache space is full or contains available space to cache the set of data. For example, the cache management table may be an embodiment of cache management table 336 described above in relation to data storage medium 330 in FIG. 3. If the drive controller determines that insufficient space is available in the cache space to write the set of data to the cache space, method 600 may proceed to step 620 (No). Conversely, if the drive controller determines that sufficient space is available for the cache space to write the set of data, method 600 may proceed to step 635 (Yes).

In the situation where insufficient space is available to write the set of data to the cache space, the drive controller may be configured to increase the size of the cache to make room for the set of data. More specifically, at step 620, the drive controller may determine how much additional space is needed in the cache space in order to write the set of data to the cache space. In some embodiments, the drive controller may determine exactly how much additional space is needed to store the set of data along with space in the cache space that is available. For example, if the set of data is 100 megabytes (MB) and the drive controller determines that the cache space has only 40 MB available, the drive controller may determine that 60 MB of additional space are needed. In other embodiments, the drive controller may determine an amount of additional space larger than what is needed to store the set of data. For example, if the set of data is 100 MB and the cache space has 40 MB available, the drive controller may determine that additional space of a constant, predetermined size such as 1000 MB (i.e. 1 GB) may be needed. In this way, the additional space may allow additional sets of data to be cached without the drive controller having to repeat steps 620 through 630 for each and every set of data received. As described above in relation to FIG. 5, the drive controller may employ a conversion ratio to determine an amount of storage space (having SMR areal density) that corresponds with the additional amount of cache space (having PMR areal density). Method 600 may then proceed to step 625.

At step 625, the drive controller may determine that an available portion of the storage space (e.g., storage space 522 of FIG. 5) is sufficient to store the set of data. More specifically, if the amount of additional space determined at step 620 was 60 MB, the drive controller may determine that the available portion of the storage space is at least 60 MB. If the amount of additional space determined at step 620 was 1 GB, the drive controller may determine that the available portion of the storage space is at least 1 GB. If the determined amount of additional space is not available in the storage space, the storage medium may be highly fragmented and/or filled to capacity, and method 600 may end until the data storage medium can be defragmented or until space otherwise becomes available. However, when the drive controller determines that the amount of additional space determined at step 620 is present in the available portion of the storage space, method 600 may proceed to step 630.

At step 630, the drive controller may dynamically convert the available portion of the storage space into a dynamic cache space associated with the cache space. For example, the drive controller may reformat an amount of space determined at step 620 (e.g., 60 MB or 1 GB in the examples described above) from SMR technology used for high-density storage to PMR technology used for efficiently writing data to the cache space. Although the dynamic cache space might not actually be currently available for long-term data storage after it is reformatted to PMR technology and associated with the cache space, the dynamic cache space may remain visible to the host as being the available portion of the storage space. As described in more detail below with respect to FIG. 7, the drive controller may safely misrepresent the way that the configurable space is being used to the host because the drive controller may reconvert the dynamic cache space back into available storage space before the host actually uses the available storage space to store data. Method 600 may then proceed to step 635.

Whether method 600 arrives at step 635 from step 615 or from step 630, at step 635 the drive controller may write the set of data to the cache space. If the dynamic cache space was converted from the available storage space in step 630, some or all of the set of data may be stored to the dynamic cache space. After the set of data is written to the cache space, method 600 may proceed to step 640.

At step 640, the drive controller may report to the host that the set of data is written to the storage space of the data storage medium. It will be noted that at step 640, the set of data might not actually be written to the storage space yet, but only to the cache space. However, because the drive controller may be configured to eventually flush the set of data from the cache space to the storage space without further direction from the host (as described below in relation to FIG. 7), the drive controller may report to the host that writing the set of data to the storage space has already been performed. In this way, the caching, and the details of the dynamic caching in particular, may be abstracted away from the host such that the host may simply send read and write commands to the drive controller without accounting for the data caching or the details of how dynamic caching is performed. After the report to the host is made, method 600 may return to step 605 where the drive controller may wait to receive additional direction from the host or, if the host has not directed that a higher-priority task be performed, may perform additional tasks as described below in relation to FIG. 7. For example, after reporting to the host that the set of data was written to the storage space, the drive controller may flush the set of data from the cache space to the storage space.

Figure 7:
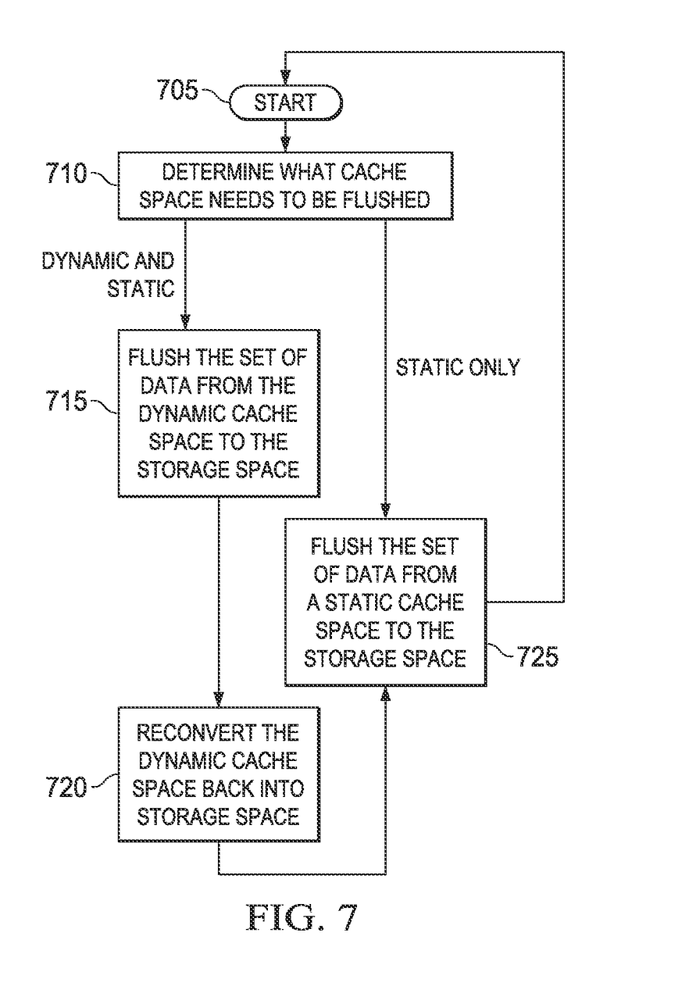
FIG. 7 is a flowchart depicting selected elements of an embodiment of a method for flushing a cache space and reconverting a dynamic cache space into available storage space in a data storage drive within an information handling system.

FIG. 7 is a flowchart depicting selected elements of an embodiment of a method for flushing a cache space and reconverting a dynamic cache space into available storage space in a data storage drive within an information handling system. Method 700 may be performed by any suitable drive controller such as the same drive controller described above in relation to method 600 in FIG. 6. Likewise, method 700 may be performed on the same data storage medium having the same cache space, storage space, and/or configurable space (e.g., available storage space or dynamic cache space) as described in relation to method 600. Accordingly, method 700 may be performed in conjunction with method 600. For example, in some embodiments, method 700 may be performed by the drive controller when the host described above in relation to method 600 has not given the drive controller any high-priority direction, leaving the drive controller with sufficient time to perform method 700 while waiting for additional direction from the host. In some examples, method 700 may be performed even though method 600 may be ongoing or the host may have directed that the drive controller perform a high-priority task such as writing a set of data. For example, if the available storage space on the data storage medium is getting too small, method 700 may need to be performed to reconvert dynamic cache space back into available storage space for storing data from the host.

Method 700 may begin at step 705, where the drive controller may determine that there is sufficient time to perform method 700. For example, step 705 may be the same as step 605 described above in relation to method 600. If the drive controller receives a high-priority command from the host (e.g., to write a set of data), the drive controller may proceed to perform step 610 of method 600, but if no such command has been received, the drive controller may proceed to perform step 710 of method 700.

At step 710, the drive controller may determine what parts of the cache space need to be flushed. For example, in some examples, only a static portion of the cache space (e.g., static cache space 510 described in relation to FIG. 5) may be in use. In other examples, the static portion of the cache space may have filled up such that a dynamic cache space (e.g., configurable space 530 described in relation to FIG. 5) may also be employed. If the drive controller determines that both a dynamic and a static cache space need to be flushed, method 700 may proceed to step 715 to flush contents of the cache space to the storage space starting with contents of the dynamic cache space. Conversely, if the drive controller determines that only a static cache space needs to be flushed, method 700 may proceed directly to step 725 to flush contents from the static cache space to the storage space.

At step 715, based on determining that both the dynamic and the static cache spaces include a set of data that may be flushed to the storage space, the drive controller may flush contents of the dynamic cache space to the storage space. In other words, the drive controller may move or copy data stored temporarily in the dynamic cache space to a more permanent storage location in the storage space. As such, whereas the data may have been written to the cache space using PMR technology, the data now may be stored with higher areal data density in the storage space using SMR technology. In this way, the data storage drive may hold as much data as possible using the high areal data density of SMR technology without forcing the host to wait for the slow writing performance associated with the SMR technology. As between the contents of the static cache space and the dynamic cache space, the drive controller may prioritize flushing the contents of the dynamic cache space first because the dynamic cache space may still appear to the host as being part of the storage space available for storing data. Accordingly, the drive controller may be configured to keep the dynamic cache space as empty as possible so that it may be readily reconverted back to available storage space if the available storage space begins to run out. Conversely, because the static cache space may never be visible to the host as available storage space, it may be a lower priority to flush the contents of the static cache space. After flushing the set of data from the dynamic cache space to the storage space, method 700 may proceed to step 720.

At step 720, in response to flushing the contents of the dynamic cache space, the drive controller may reconvert the dynamic cache space back into the available portion of the storage space visible to the host. Reconverting the dynamic cache space back into the available portion of the storage space may include reformatting the dynamic cache space from using PMR technology back to using SMR technology. As described above in relation to FIG. 5, the drive controller may employ an inverse conversion ratio to determine an amount of available storage space (having SMR areal density) that will be provided by the reconversion of the dynamic cache space (having PMR areal density). Just as the drive controller might not have reported to the host that the dynamic cache space was provisioned by converting the available portion of the storage space, the drive controller likewise might not report to the host that the dynamic cache space is reconverted to once again be part of the storage space. Rather, as described above, the converted space may always appear to the host as being storage space available for storing data. After the dynamic cache space is reconverted back into storage space, method 700 may proceed to step 725.

At step 725, the drive controller may flush contents of the static portion of the cache space to the storage space in a similar manner as the drive controller flushed the contents of the dynamic portion at step 715. Specifically, some or all of the contents temporarily stored in the static portion of the cache space may be copied or moved to be stored with higher density (e.g., using SMR technology) in the storage space so as to free up space in the cache space to cache more data being written or read by the host. When the contents of the static cache space are flushed to the storage space, the cache space may be empty and method 700 may return to step 705 in order to wait for a command to be received from the host.

In certain embodiments, a method may include converting, by a drive controller associated with a data storage medium, an available portion of a storage space of the data storage medium into a dynamic cache space, the dynamic cache space remaining visible to a host as the available portion of the storage space; writing, by the drive controller, a set of data to the dynamic cache space; flushing, by the drive controller, the set of data written to the dynamic cache space to the storage space; and reconverting, by the drive controller after flushing the set of data, the dynamic cache space back into the available portion of the storage space visible to the host. The method may further include reporting, by the drive controller to the host, that the set of data was written to the storage space in response to writing the set of data to the dynamic cache space. In the method, the data storage medium may be a hard disk; the storage space of the data storage medium may be written using SMR; and the dynamic cache space of the data storage medium may be written using PMR. In the method, converting the available portion of the storage space into the dynamic cache space may include reformatting the available portion of the storage space from SMR to PMR; and reconverting the dynamic cache space back into the available portion of the storage space may include reformatting the dynamic cache space from PMR to SMR. In the method, the data storage medium may be a hard disk having an annular writeable portion with an inner diameter and an outer diameter; the storage space of the data storage medium may be written beginning at the inner diameter of the writeable portion and progressing substantially outward toward the outer diameter of the writeable portion; and the cache space of the data storage medium may be written beginning at the outer diameter of the writeable portion and progressing substantially inward toward the inner diameter of the writeable portion.

A drive controller associated with a data storage medium may receive a command from a host to write a set of data to a storage space of the data storage medium. The drive controller may determine that insufficient space is available in a cache space of the data storage medium to write the set of data to the cache space and may dynamically convert an available portion of the storage space into a dynamic cache space associated with the cache space. The dynamic cache space may remain visible to the host as the available portion of the storage space. The drive controller may then write the set of data to the cache space and report to the host that the set of data is written to the storage space of the data storage medium.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, by a drive controller, a command from a host to write a set of data to a storage space of a data storage medium, that includes at least one disk platter, associated with the drive controller;
   determining, by the drive controller, that insufficient space is available in a cache space of the data storage medium to write the set of data to the cache space;
   in response to determining that insufficient space is available in the cache space of the data storage medium to write the set of data to the cache space, determining, by the drive controller, that an available portion of the storage space is available, the available portion of the storage space previously formatted in a first format that includes track sections of the at least one platter such that at least one particular track section overlaps with at least one neighboring track section;

in response to determining that the available portion of the storage space is available, reformatting, by the drive controller, the available portion of the storage space to convert the available portion of the storage space into a dynamic cache space formatted in a second format that includes track sections of the at least one platter such that the least one particular track section does not overlap with any neighboring track sections, wherein the dynamic cache space remains visible to the host as the available portion of the storage space and wherein the available portion of the storage space converted into the dynamic cache space is unavailable for long-term storage of data designated for storage by the host; and after reformatting the available portion of the storage space into the dynamic cache space formatted in the second format, writing, by the drive controller, the set of data to the dynamic cache space.

2. The method of claim 1, further comprising:

reporting to the host, by the drive controller in response to writing the set of data to the dynamic cache space, that the set of data is written to the storage space of the data storage medium; and flushing, by the drive controller, the set of data from the dynamic cache space to the storage space after reporting to the host that the set of data was written to the storage space.

3. The method of claim 1, wherein the cache space comprises:

the dynamic cache space converted from the available portion of the storage space and visible to the host as the available portion of the storage space; and a static cache space formatted in the second format and having a fixed size, the static cache space unavailable to be used by the host as part of the storage space.

4. The method of claim 3, further comprising:

flushing, by the drive controller, contents of the cache space to the storage space starting with contents of the dynamic cache space; and reformatting, by the drive controller in response to flushing the contents of the dynamic cache space, the dynamic cache space formatted in the second format to convert back into the available portion of the storage space formatted in the first format visible to the host.

5. The method of claim 1, wherein:

the data storage medium is a hard disk that includes the at least one disk platter;

the first format includes a shingled magnetic recording (SMR) format; and the second format includes a perpendicular magnetic recording (PMR) format.

6. The method of claim 1, wherein:

the data storage medium is a hard disk having an annular writeable portion with an inner diameter and an outer diameter;

the storage space of the data storage medium is written beginning proximate the inner diameter of the writeable portion and progressing substantially outward toward the outer diameter of the writeable portion; and the cache space of the data storage medium is written beginning proximate the outer diameter of the writeable portion and progressing substantially inward toward the inner diameter of the writeable portion.

7. An information handling system comprising:

a data storage medium including at least one disk platter, a storage space, and a cache space;

a processor; and a non-transitory computer-readable medium comprising instructions that, when read and executed by the processor, are configured to cause the processor to:

receive a command from a host to write a set of data to the storage space of the data storage medium;

determine that insufficient space is available in the cache space of the data storage medium to write the set of data to the cache space;

in response to determining that insufficient space is available in the cache space of the data storage medium to write the set of data to the cache space, determine that an available portion of the storage space is available, the available portion of the storage space previously formatted in a first format that includes track sections of the at least one platter such that at least one particular track section overlaps with at least one neighboring track section;

in response to determining that the available portion of the storage space is available, reformat the available portion of the storage space to convert the available portion of the storage space into a dynamic cache space formatted in a second format that includes track sections of the at least one platter such that the least one particular track section does not overlap with any neighboring track sections, wherein the dynamic cache space remains visible to the host as the available portion of the storage space; and after reformatting the available portion of the storage space into the dynamic cache space formatted in the second format, write the set of data to the dynamic cache space.

8. The information handling system of claim 7, wherein the instructions are configured to further cause the processor to:

report to the host, in response to writing the set of data to the dynamic cache space, that the set of data is written to the storage space of the data storage medium; and flush the set of data from the dynamic cache space to the storage space after reporting to the host that the set of data was written to the storage space.

9. The information handling system of claim 7, wherein the cache space comprises:

the dynamic cache space converted from the available portion of the storage space and visible to the host as the available portion of the storage space; and a static cache space formatted in the second format and having a fixed size, the static cache space unavailable to be used by the host as part of the storage space.

10. The information handling system of claim 9, wherein the instructions are configured to further cause the processor to:

flush contents of the cache space to the storage space starting with contents of the dynamic cache space; and reformat, in response to flushing the contents of the dynamic cache space, the dynamic cache space formatted in the second format to convert back into the available portion of the storage space formatted in the first format visible to the host.

11. The information handling system of claim 7, wherein:

the data storage medium is a hard disk that includes the at least one disk platter;

the first format includes a shingled magnetic recording (SMR) format; and the second format includes a perpendicular magnetic recording (PMR) format.

12. The information handling system of claim 7, wherein:

the data storage medium is a hard disk having an annular writeable portion with an inner diameter and an outer diameter;

the storage space of the data storage medium is written beginning proximate the inner diameter of the writeable portion and progressing substantially outward toward the outer diameter of the writeable portion; and the cache space of the data storage medium is written beginning proximate the outer diameter of the writeable portion and progressing substantially inward toward the inner diameter of the writeable portion.

13. An article of manufacture comprising:

a non-transitory machine-readable medium; and instructions on the non-transitory machine-readable medium that, when read and executed by a processor, are configured to cause the processor to:

receive a command from a host to write a set of data to a storage space of a data storage medium, that includes at least one disk platter, associated with a drive controller;

determine that insufficient space is available in a cache space of the data storage medium to write the set of data to the cache space;

in response to determining that insufficient space is available in the cache space of the data storage medium to write the set of data to the cache space, determine that an available portion of the storage space is available, the available portion of the storage space previously formatted in a first format that includes track sections of the at least one platter such that at least one particular track section overlaps with at least one neighboring track section;

in response to determining that the available portion of the storage space is available, reformat the available portion of the storage space to convert the available portion of the storage space into a dynamic cache space formatted in a second format that includes track sections of the at least one platter such that the least one particular track section does not overlap with any neighboring track sections, wherein the dynamic cache space remains visible to the host as the available portion of the storage space; and after reformatting the available portion of the storage space into the dynamic cache space formatted in the second format, write the set of data to the dynamic cache space.

14. The article of claim 13, wherein the instructions are configured to further cause the processor to:

report to the host, in response to writing the set of data to the dynamic cache space, that the set of data is written to the storage space of the data storage medium; and flush the set of data from the dynamic cache space to the storage space after reporting to the host that the set of data was written to the storage space.

15. The article of claim 13, wherein the instructions are configured to further cause the processor to:

flush contents of the dynamic cache space to the storage space; and reformat, in response to flushing the contents of the dynamic cache space, the dynamic cache space formatted in the second format back into the available portion of the storage space formatted in the first format visible to the host.

16. The article of claim 13, wherein:

the data storage medium is a hard disk that includes the at least one disk platter;

the first format includes a shingled magnetic recording (SMR) format; and the second format includes a perpendicular magnetic recording (PMR) format.

17. The article of claim 13, wherein the available portion of the storage space converted into the dynamic cache space is unavailable for long-term storage of data designated for storage by the host.

* * * * *